2,794,338

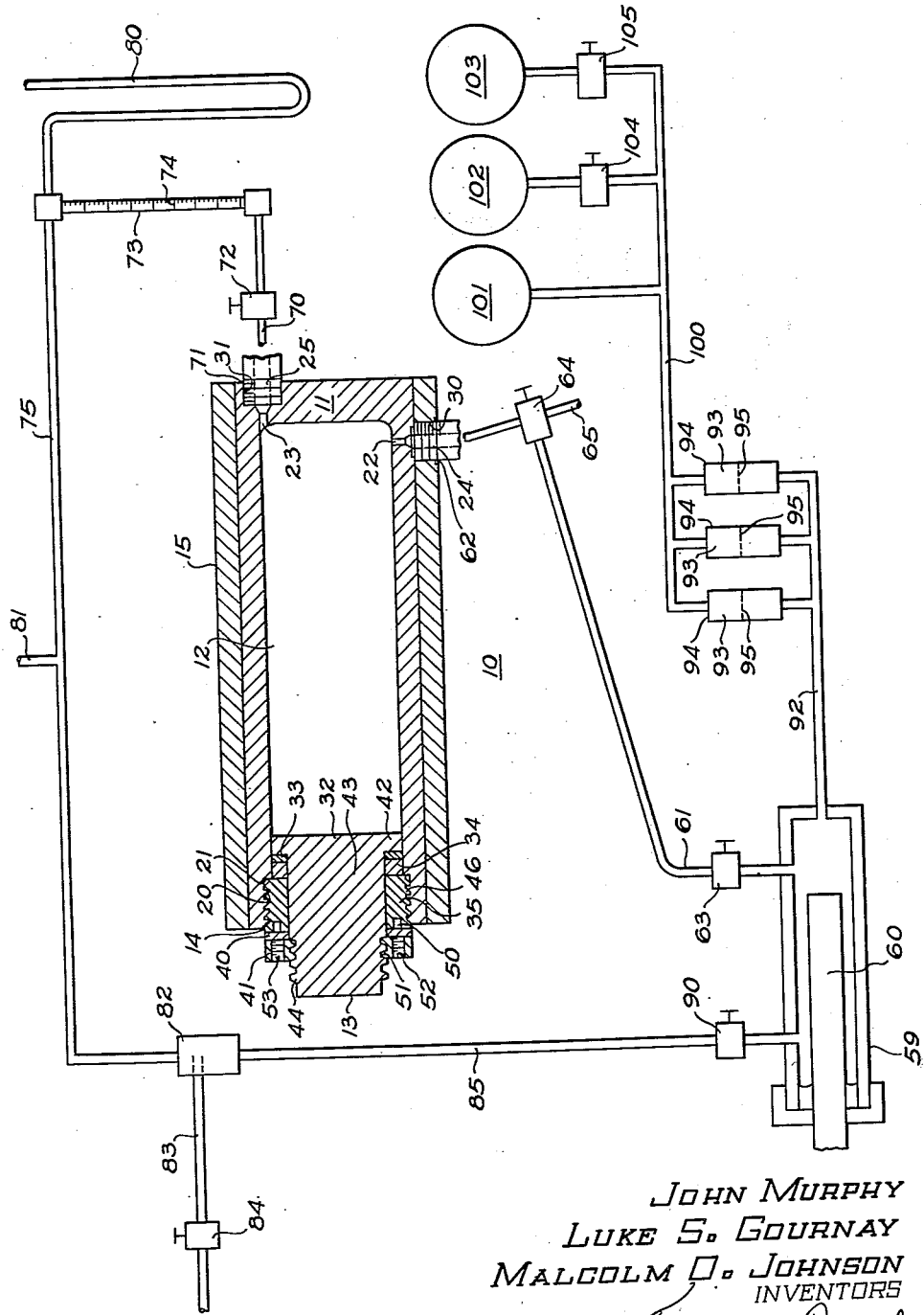

DETERMINATION OF PORE SIZE DISTRIBUTION IN LARGE CORE SAMPLES

John Murphy, Luke S. Gournay, and Malcolm O. Johnson, Dallas, Tex., assignors, by mesne assignments, to Socony Mobil Oil Company, Inc., a corporation of New York Application January 12, 1954, Serial No. 403,585

6 Claims. (Cl. 73—38)

This invention relates to core samples taken from the earth and relates particularly to the determination of the pore size distribution in large core samples.

In the evaluation of the total potential production from a petroleum oil or gas reservoir, knowledge of the total pore volume is essential and is obtained from measurements made on core samples taken from the subterranean reservoir. The actual recovery from a reservoir, however, is only a portion of the total potential production. One factor influencing the actual recovery is the pore size distribution within the reservoir, since flow of oil or gas will be more readily effected under available pressure differentials where the pore volume of the reservoir comprises a comparatively high proportion of comparatively large pores.

Various methods and apparatus are employed for determination of the pore size distribution within a reservoir. Generally, these methods and apparatus are based upon the principle that the surface tension of any liquid having a contact angle greater than 90°, i. e., a "nonwetting" liquid, opposes the entrance of such liquid into a small pore. The pressure required to force a liquid into a pore of given size, assuming that the pore has a circular cross section, is given by the expression:

$$p = \frac{-2\sigma \cos \theta}{r}$$

where $p$ is the pressure on the liquid,
$\sigma$ is the surface tension,
$\theta$ is the contact angle between the wall of the pore and the surface of the liquid, and
$r$ is the radius of the pore.

Employing this principle, a sample taken from the subterranean reservoir is immersed in mercury and the volume of mercury imbibed by the sample with increases in mercury pressure is measured. From the information thus obtained, the total volume of pore space for any range of pore size radii may be calculated employing the above expression.

These measurements have heretofore been made on cuttings or on small core samples. However, because of the fact that these measurements have been made on cuttings or on small core samples, they are subject to uncertainties arising from the possibility that the cuttings or core samples are not representative of the reservoir. In recent years, the problem of these uncertainties has become of greater concern with the increased drilling and production of carbonate reservoirs where inhomogeneities are more probable than in sandstone reservoirs.

It is an object of this invention to reduce uncertainties in the measurement of pore size distribution in core samples taken from a subterranean reservoir. It is another object of this invention to provide a method and apparatus for determining pore size distribution in large core samples taken from a subterranean reservoir. It is another object of this method to measure pore size distribution of large core samples by imbibition of mercury.

These and other objects of the invention will become apparent from the following detailed description thereof taken in conjunction with the single figure which is a side view, partly in cross section, of a core sample cell and a schematic arrangement of auxiliary apparatus.

Referring now to the drawing, the core sample cell, indicated generally by the numeral 10, comprises a cylinder 11 having a cylindrical core sample chamber 12 formed therein and a closure 13 at the opening 14. Surrounding the entire outer surface of the cylinder 11 is jacket 15, which jacket is fitted over the cylinder 11 by shrinking. The cylinder, near the opening 14, is provided with internal threads 20 and with shoulder 21 and, at the other end thereof, is provided with laterally extending port 22 and with longitudinally extending port 23. Ports 22 and 23 are 180° apart with respect to the longitudinal axis of the cylinder 11 and port 23 is located immediately adjacent to the longitudinal wall of the cylinder 11. Port 22 leads to socket 24 in the jacket 15 and port 23 leads to socket 25 in the cylinder 11 and sockets 24 and 25 are provided with internal threads 30 and 31, respectively. The cylinder 11 and the jacket 15 are of relatively heavy metal construction to withstand the imposition of high pressures.

The closure 13 comprises head member 32, gasket 33, back-up ring 34, ring nut 35, wear ring 40, and draw ring 41. The head member 32 has a lip portion 42 and a body portion 43. The diameter of the lip portion is greater than the diameter of the body portion and the lip portion fits movably within the chamber 12 but closely contacts the inner surface of the cylinder 11. The body portion is provided with threads 44 at its end opposite the lip portion. Gasket 33 has an external diameter equal to the diameter of the chamber 12 and has an internal diameter equal to the diameter of the body portion of the head member. The gasket may be constructed of any suitable soft material, as, for example, "neoprene," and serves to provide a seal to prevent leakage of fluid between the head member and the inner surface of the cylinder 11. The back-up ring 34 has an external diameter equal to the diameter of the chamber 12 and has an internal diameter equal to the diameter of the body portion of the head member. The ring nut 35 has an external diameter equal to the major diameter of the shoulder 21 and an internal diameter equal to the diameter of the body portion of the head member. The ring nut is provided with external threads 46 to cooperate with threads 20 and is provided with a plurality of recesses 50 to accommodate a tool for tightening the ring nut into position within the cylinder 11. The wear ring 40 has an external diameter equal to the major diameter of the shoulder 21 and has an internal diameter equal to the diameter of the body portion of the head member. Draw ring 41 has an external diameter equal to the major diameter of the shoulder 21 and has an internal diameter equal to the diameter of the body portion of the head member. The draw ring is provided with internal threads 51 to cooperate with threads 44 and with a plurality of threaded recesses 52 to accommodate set screws 53. With the exception of the gasket 33, each of the head member, back-up ring, ring nut, wear ring, and draw ring is of heavy metal construction designed to withstand the imposition of high pressures.

Pump 59 having piston 60 is connected through line 61 with port 22 by means of threaded fitting 62 received within socket 24. The line 61 is either vertically or upwardly inclined between the pump and the port 22. The pump 59 is a volumetric metering pump displacing a uniform volume of fluid with each uniform linear distance of movement of the piston 60. The line 61 is provided with valve 63, drain valve 64, and drain line 65. Line 70 provided with threaded fitting 71 received within socket 25 leads from port 23. The line 70 is also provided with valve 72 and leads to glass capillary tube 73 having meter scale 74. The volume versus length relationship of the tube 73 is known either by virtue of a precision bore or having been calibrated. The meter scale preferably indicates the height above the port 23. The other end of tube 73 is connected to line 75 provided with manometer 80. Each arm of the manometer 80 has a length such that the hydrostatic head of a volume of fluid therein will be at least equal to atmospheric pressure. The line 75 leads to a vacuum pump or other vacuum system (not shown), such as a mercury diffusion pump, through line 81, provided with a valve (not shown), and to mercury de-aerator 82. Line 83 provided with valve 84 connects de-aerator 82 with a source of mercury (not shown). Line 85 leads from de-aerator 82 to pump 59 and is provided with valve 90. Line 92 leads from the pump 59 to a plurality of gauge savers 93. Each gauge saver comprises a heavy walled receptacle 94 provided with a rubber diaphragm 95 dividing the receptacle into an upper and a lower chamber. Line 100 leads from each of the gauge savers to pressure gauges 101, 102, and 103, the line leading into gauges 102 and 103 being provided with valves 104 and 105, respectively. Gauges 101, 102, and 103 may be designed to indicate pressures between 0 and 10,000, 0 and 3,000, and 0 and 300 pounds per square inch, respectively, and may be oil-filled gauges, the oil filling the gauges, the line 100, and the upper chamber of the gauge savers.

The core sample cell is adapted for use with large core samples. It may have a length and diameter such that the chamber 12 inwardly of the closure 13 is at least twelve inches in length and at least four inches in diameter. However, it may also have other dimensions as desired depending upon the size of the core samples whose pore size distribution is to be measured. In accordance with a particular aspect of the invention, the core sample cell 10 is mounted such that its longitudinal axis is substantially horizontal and the port 23 is on a level at least equal to the highest point within the chamber 12 inward of the closure 13. The longitudinal axis of the core sample cell may vary from the true horizontal but it is preferred that the declination be not greater than about 5°. Where the longitudinal axis varies from the horizontal, the portion bearing the opening 14 must be the lower portion in order to maintain the port 23 at a level as high as any other portion of the chamber 12. By mounting the core sample cell such that its longitudinal axis is substantially horizontal and the port 23 is on a level at least equal to the highest point within the chamber 12 inward of the closure 13, the entrapment of any gas within the chamber is prevented. The entrapment of any gas within the line 61 also is prevented by vertically or upwardly inclining the line. Thus, errors arising from compression of gas being assumed as imbibition of mercury are eliminated. Further, by mounting the core sample cell such that its longitudinal axis is substantially horizontal, differences in the hydrostatic pressure of the mercury imposed upon the core sample are along the shortest dimension of the core sample and are therefore minimized. Thus, the pressure on the core sample indicated by the height of a column of mercury is the average pressure between two pressures that are as near to each other as can possibly be obtained.

In measuring the pore size distribution in a core sample, the core sample is first treated to remove oil or other liquid material contained therein. This may be accomplished by extracting the core sample with a solvent such as acetone, benzene, toluene, or other solvent in which the oil or other fluid is soluble. Following extraction, the core sample is thoroughly dried of all solvent, as, for example, by heating in a drying oven at about 100° C.

The cleaned and dried core sample is placed within the chamber 12. In order that the core sample will not touch the walls of the chamber and thereby create narrow spaces between the core sample and the walls of the chamber which would have the same effect as pores within the core sample in so far as imbibition of mercury is concerned, a plurality of metal rings are placed around the core sample prior to placing within the chamber. The metal rings are preferably of the order of one-sixteenth inch in thickness and in width and at least two, but preferably three to six, are employed. For the same reason, the length of the core sample is selected with respect to the length of the chamber such that the core sample will not closely approach the head member 32 or the end wall of the chamber. The diameter of the core sample is measured. The thickness of the rings is also measured, if not already known. The gasket 33 and the back-up ring 34 are positioned around the body portion 43 of the head member 32 and the head member is placed within the chamber 12. The ring nut 35 is then screwed into position such that it contacts the shoulder 21, the wear ring 40 is placed around the body portion of the head member 32, and the draw ring 41 is tightened down upon the head member. Set screws 53 are then tightened whereby the head member 32 is drawn outwardly and compresses the gasket 33 between the lip 42 of the head member and the back-up ring 34.

Valves 64 and 84 are closed, valve 72 is opened, the open end of manometer 80 is temporarily plugged, and the system is evacuated by drawing the gas therein through line 81. Evacuation is continued until substantially all of the gas within the core sample, and within the system, is removed therefrom. Evacuation to a pressure of about five microns of mercury is satisfactory. While maintaining the vacuum within the system, valves 63 and 90 are opened and valve 84 is opened, whereupon mercury enters the system through line 83. The mercury sprays into the de-aerator 82 and any entrained gas is removed from the mercury and passes out of the system through the line 81. The mercury passes downwardly through line 85 and is permitted to fill the pump 59, the line 92, the bottom chamber of the gauge savers 94, the line 61, and the chamber 12 to submerge the core sample. The mercury is also permitted to enter the lower portion of the tube 73. Valve 84 is then closed to discontinue the supply of mercury and valve 90 is also closed. Mercury is placed in manometer 80 after unplugging and manometer 80 serves to indicate the pressure within the system.

The core sample within the chamber 12 will be under a pressure represented by the height of the column of mercury within the capillary tube 73 above the port 23 plus the height of a column of mercury equal to the sum of one thickness of the rings around the core sample and one-half the diameter of the core sample plus the pressure indicated by the manometer 80. The pump 59 is now operated, by movement of the piston 60, to increase the pressure of the mercury upon the core sample within the chamber 12 by desired increments and the volume of mercury imbibed by the core sample with each increment of pressure is measured. Pump 59, as stated, is a volumetric metering pump and for each unit of distance that the piston 60 is moved a unit amount of mercury is pumped through the line 61. The piston 60 is moved over a short distance, for example, a distance such that approximately ½ cc. of mercury is pumped through the line 61, and the rise in the column of mercury in the tube 73 and the difference in the column of mercury in the manometer 80 are measured. Since the tube 73 has a precision bore or is calibrated with respect to volume versus height, the volume of mercury passing into the tube for this movement of the piston 60 can be determined. The difference between the amount of mercury displaced by the piston 60 and the amount of the mercury entering the capillary tube 73 will be the amount of mercury imbibed by the core sample at the pressure represented by the height of mercury within the tube 73 plus the pressure indicated by the manometer 80 plus the constant pressure represented by the height of a column of mercury equal to the sum of the ring thickness and one-half the diameter of the core sample. This procedure is repeated until the height of mercury within the tube 73 reaches some arbitrary level, this level being one above which the sensitivity of measurement of pressure on the core sample by the height of the column of mercury in the tube 73 and the manometer 80 is no longer required. The amount of mercury imbibed for each increase in pressure up to this point is noted. In this connection, care should be taken that the height of the column of mercury in the tube 73 and the reading on manometer 80 comes to equilibrium before taking a reading and before increasing the pressure by the next increment. Further, care should be taken that the pressure on the core sample is never increased above the pressure at which the volume of mercury imbibed is to be measured, since because of hysteresis effects a decrease thereafter to the desired pressure will give an erroneous indication of the volume of mercury imbibed.

The volume of mercury imbibed by the core sample with further increases in pressure is now measured. It is preferred, at this point, that the arbitrary level attained by the column of mercury in the tube 73 represents a pressure on the core sample less than that of the atmosphere. Atmospheric pressure is imposed upon the mercury within the tube 73 in increments by intermittently opening valved line 81 to the atmosphere. Upon each opening of line 81 to the atmosphere, the mercury in the tube 73 will descend. However, sufficient mercury must be in the tube 73 to prevent the level of the mercury in the chamber 12 from descending below the top of the core sample when the full atmospheric pressure is imposed upon the column. The tube 73 thus serves the function of a storage reservoir for mercury. The column of mercury is brought back to its level after each incremental increase in pressure by opening of line 81 to the atmosphere by operation of the pump 59. With each incremental increase, the pressure on the core sample will be the pressure prior to the opening of line 81 to the atmosphere plus the additional pressure of the atmosphere and consequently a volume of mercury will be imbibed by the core sample. This volume of mercury will be the difference between the volume of mercury pumped by the pump 59 to bring the column of mercury back to its level and the difference in the volume of tube 73 between this level and the level to which it dropped on each incremental opening of line 81 to the atmosphere.

For pressures on the core sample above atmospheric, gauges 101, 102, and 103 will have sufficient accuracy for pressure measurement. During the operations described above, the pressure on the core sample is also given by the gauges 101, 102, and 103, but the measurement of the pressure by these gauges is not sufficiently sensitive at the low pressures to give sufficiently accurate determination of the pore size distribution in the core sample. Valve 72 is closed and with valves 104 and 105 open, the pump 59 is operated to pump mercury into the system and to increase the pressure by suitable increments. The system being closed, each volume of mercury pumped therein by movement of the piston 60 will be imbibed by the core sample and the pressure will be indicated by the gauges 101, 102, and 103. This procedure is repeated until the pressure on the core sample is at the desired upper limit which may be of the order of 5000 or more pounds per square inch.

It is possible that imposition of pressure upon the system may cause expansion of parts thereof to give a false indication of imbibition of mercury. Correction for the expansion of the system may be made by carrying out the procedure described above with the exception that the core sample is not placed within the chamber 12. However, the rings which are employed to prevent contact of the core sample with the walls of the cylinder 11 are placed within the chamber 12. The apparent imbibition of mercury obtained with each incremental increase in pressure under these conditions is subtracted from the volume change obtained with the same incremental increase in pressure with the core sample in the chamber.

Having described a method of carrying out the invention, the manner in which the values obtained therefrom may be used to determine the pore size distribution is readily apparent from the following relationships. As pointed out above, $$p = \frac{-2\sigma \cos \theta}{r} \quad (1)$$

By measurement, the angle $\theta$ may be determined. From a series of tests with typical core materials 140° has been found to be generally the value within ±5° of the angle $\theta$ where mercury is the liquid. Similarly, $\sigma$ may be taken as 486 dynes per centimeter. Hence, $$r = \frac{55 \times 10^{-3} \text{ cm.}}{p \text{ (cm. of mercury)}} \quad (2)$$

From the experimental observations a curve (pressuring curve) showing the variation in volume of mercury imbibed with change in the applied pressure may be made.

The total volume of al pores having a radius between $r$ and $r + dr$ may be expressed as $$dV = D(r) dr \quad (3)$$

where $D(r)$ is the distribution function for pore size. Since $\sigma$ and $\theta$ are constant, from Equations 1 and 3

$$dV = -D(r) \frac{r}{p} dp \quad (4)$$

The volume measured is the pore volume of all pores whose openings have a radius equal to or greater than $r$ (the total pore volume), $V_0$ decreased by the volume V, of pores smaller than $r$. Since $$\frac{d(V_0 - V)}{dp} = -\frac{dV}{dp}$$

and since the slope $$\frac{-dV}{dp}$$

is a determinable quantity from the pressuring curve, the relationship between $D(r)$ and $r$ may be readily plotted, as is evident by rewriting Equation 4 to read $$D(r) = -\frac{p}{r} \frac{d(V_0 - V)}{dp} \quad (5)$$

For any desired number of values of $p$, the slope may be graphically determined and the values for $D(r)$ determined from Equation 5. The values for $r$ may be determined from Equation 2, corresponding to the values for $D(r)$ and the distribution in cubic centimeters per angstrom plotted against the pore radius in angstroms. The area under the curve between any two values for the radius will, of course, give the volume in cubic centimeters of the total pores having radii over the size range selected. A graphical presentation of the variation in the distribution function with pore size is usually adequate. Known instruments may be used for routine investigation to directly translate the pressuring curve to the distribution curve without requiring a graphical solution of the slope at a plurality of points.

Having thus described our invention, it will be understood that such description has been given by way of illustration and example and not by way of limitation, reference for the latter purpose being had to the appended claims.

We claim:

1. In apparatus for the measurement of the pore size distribution in a core sample a sample holder comprising in combination a cylinder having a substantially horizontally disposed longitudinal axis, said cylinder having a chamber therein adapted to hold a core sample and an opening at one end thereof leading to said chamber, a head member having a lip portion closely fitting within said opening and having a body portion, a gasket surrounding said body portion of said head member adjacent to said lip portion of said head member, a ring member surrounding said body portion of said head member adjacent to said gasket, a ring nut surrounding said body portion of said head member adjacent to said ring member and threadedly engaging said cylinder, a wear ring surrounding said body portion of said head member adjacent to said ring nut, a draw ring externally surrounding and threadedly engaging said body portion of said head member, a plurality of set screws passing through said draw ring adapted to contact said wear ring, a jacket tightly surrounding said cylinder, means providing a fluid inlet port to said chamber, and means providing a fluid outlet port from said chamber, said fluid outlet port being positioned at a level at least equal to the highest point within said chamber.

2. In apparatus for the measurement of the pore size distribution in a core sample the combination including a sample holder comprising a cylinder having a substantially horizontally disposed longitudinal axis, said cylinder having a chamber therein adapted to hold a core sample and an opening at one end thereof leading to said chamber, a closure for said chamber fitting within said opening, a jacket tightly surrounding said cylinder, means providing a fluid inlet port to said chamber, a line connected at one end thereof to said fluid inlet port, a mercury metering pump connected to the other end of said line, a pressure gauge connected to said mercury metering pump, means providing a fluid outlet port from said chamber, said fluid outlet port being positioned at a level at least equal to the highest point within said chamber, a line connected at one end thereof to said fluid outlet port, a valve in said last named line, a transparent capillary tube having a known length versus volume relationship connected at the other end of said last named line, means connected with said capillary tube for imposing a vacuum within said chamber, and means for measuring pressure connected with said capillary tube.

3. A method for measuring the pore size distribution in a core sample comprising placing said core sample in a chamber, evacuating said core sample to remove substantially all gas therefrom, covering said sample within said chamber with a body of mercury, imposing upon said body of mercury a pressure including the pressure of a column of mercury, increasing the height of said column of mercury at least once to increase the pressure thereon, measuring the volume of mercury imbibed by said core sample with said increase in pressure, restricting said body of mercury within a closed system, decreasing the volume of said closed system by known increments, and measuring the increase in pressure in said system with each of said decreases in volume.

4. In apparatus for the measurement of the pore size distribution in a core sample the combination including a sample holder comprising means providing a chamber for holding a core sample, said chamber having a substantially horizontally disposed longitudinal axis, means providing a fluid inlet port to said chamber, a liquid metering pump, a line connected between said fluid inlet port and said liquid metering pump, a pressure gauge connected to said metering pump, means providing a fluid outlet port from said chamber, said fluid outlet port being positioned at a level at least equal to the highest point within said chamber, a transparent capillary tube having a known length versus volume relationship, a valved line connected between said fluid outlet port and one end of said capillary tube, a line connected at the other end of said capillary tube and adapted for connection to pressure reducing means, and pressure measuring means connected with said line.

5. A method for measuring the pore size distribution in a core sample comprising placing said core sample in a chamber, evacuating said core sample to remove substantially all gas therefrom, covering said sample within said chamber with a body of mercury, imposing upon said body a pressure including the pressure of a column of mercury, increasing the height of said volume of mercury by steps to increase stepwise the pressure on said body of mercury, measuring the volume of mercury imbibed by said core sample with stepwise increase in the height of said column of mercury, mechanically enclosing said body of mercury and said core sample covered thereby within a space occupied solely by said core sample, any gas contained within the pores of said core sample, and said body of mercury, decreasing by steps the volume of said space occupied solely by said core sample, any gas contained within the pores of said core sample, and said body of mercury to increase stepwise the pressure on said body of mercury within said space, and measuring the pressure on said body of mercury with stepwise decrease in the volume of said space.

6. In apparatus for the measurement of the pore size distribution in a core sample the combination including a sample holder comprising a cylinder having a substantially horizontally disposed longitudinal axis, said cylinder having a chamber therein adapted to hold a core sample and an opening at one end thereof leading to said chamber, a head member having a lip portion closely fitting within said opening and having a body portion, a gasket surrounding said body portion of said head member adjacent to said lip portion of said head member, a ring member surrounding said body portion of said head member adjacent to said gasket, a ring nut surrounding said body portion of said head member adjacent to said ring member and threadedly engaging said cylinder, a wear ring surrounding said body portion of said head member adjacent to said ring nut, a draw ring externally surrounding and threadedly engaging said body portion of said head member, a plurality of set screws passing through said draw ring adapted to contact said wear ring, a jacket tightly surrounding said cylinder, means providing a fluid inlet port to said chamber, a liquid metering pump, a line connected between said fluid inlet port and said liquid metering pump, a pressure gauge connected to said metering pump, means providing a fluid outlet port from said chamber, said fluid outlet port being positioned at a level at least equal to the highest point within said chamber, a transparent capillary tube having a known length versus volume relationship, a valved line connected between said fluid outlet port and one end of said capillary tube, a line connected at the other end of said capillary tube and adapted for connection to pressure reducing means, and pressure reducing means connected with said line.

References Cited in the file of this patent

UNITED STATES PATENTS

| | | |
|---|---|---|
| 2,296,852 | Horner | Sept. 29, 1942 |
| 2,345,935 | Hassler | Apr. 4, 1944 |
| 2,604,779 | Purcell | July 29, 1952 |
| 2,617,719 | Stewart | Nov. 11, 1952 |
| 2,641,924 | Reichertz | June 16, 1953 |
| 2,676,485 | Morgan | Apr. 27, 1954 |
| 2,724,963 | Ten Brink | Nov. 29, 1955 |